US012028189B2

(12) United States Patent
Kim

(10) Patent No.: US 12,028,189 B2
(45) Date of Patent: Jul. 2, 2024

(54) SIGNAL PROCESSING DEVICE AND IMAGE DISPLAY DEVICE HAVING SAME

(71) Applicant: LG ELECTRONICS INC., Seoul (KR)

(72) Inventor: Sangwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/997,494

(22) PCT Filed: Apr. 28, 2020

(86) PCT No.: PCT/KR2020/005580
§ 371 (c)(1),
(2) Date: Oct. 28, 2022

(87) PCT Pub. No.: WO2021/221190
PCT Pub. Date: Nov. 4, 2021

(65) Prior Publication Data
US 2023/0164005 A1 May 25, 2023

(51) Int. Cl.
*H04L 25/03* (2006.01)
(52) U.S. Cl.
CPC .................. *H04L 25/03* (2013.01)
(58) Field of Classification Search
CPC ....................................... H04L 25/03
See application file for complete search history.

(56) References Cited

U.S. PATENT DOCUMENTS

| | | | |
|---|---|---|---|
| 2003/0210749 A1 | 11/2003 | Asjadi | |
| 2005/0152466 A1* | 7/2005 | Maltsev | H04L 5/0046 |
| | | | 375/260 |
| 2007/0189402 A1* | 8/2007 | Yang | H04L 27/2647 |
| | | | 375/260 |
| 2014/0198862 A1* | 7/2014 | Chen | H04B 3/542 |
| | | | 375/259 |
| 2018/0152324 A1* | 5/2018 | Park | H04L 25/0224 |

FOREIGN PATENT DOCUMENTS

| | | |
|---|---|---|
| EP | 2242226 | 6/2014 |
| JP | 2008227622 | 9/2008 |
| JP | 5949169 | 7/2016 |
| KR | 1020090073657 | 7/2009 |
| KR | 1020150136222 | 12/2015 |

OTHER PUBLICATIONS

PCT International Application No. PCT/KR2020/005580, International Search Report dated Jan. 20, 2021, 4 pages.

* cited by examiner

*Primary Examiner* — Janice N Tieu
(74) *Attorney, Agent, or Firm* — LEE, HONG, DEGERMAN, KANG & WAIMEY

(57) ABSTRACT

The present disclosure relates to a signal processing device and an image display apparatus including the same. A signal processing device according to an embodiment of the present disclosure comprises: a synchronizer configured to perform a Fourier transform based on the received baseband signal; and an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise. As a result, performances for burst noise and narrow band noise can be improved.

20 Claims, 16 Drawing Sheets

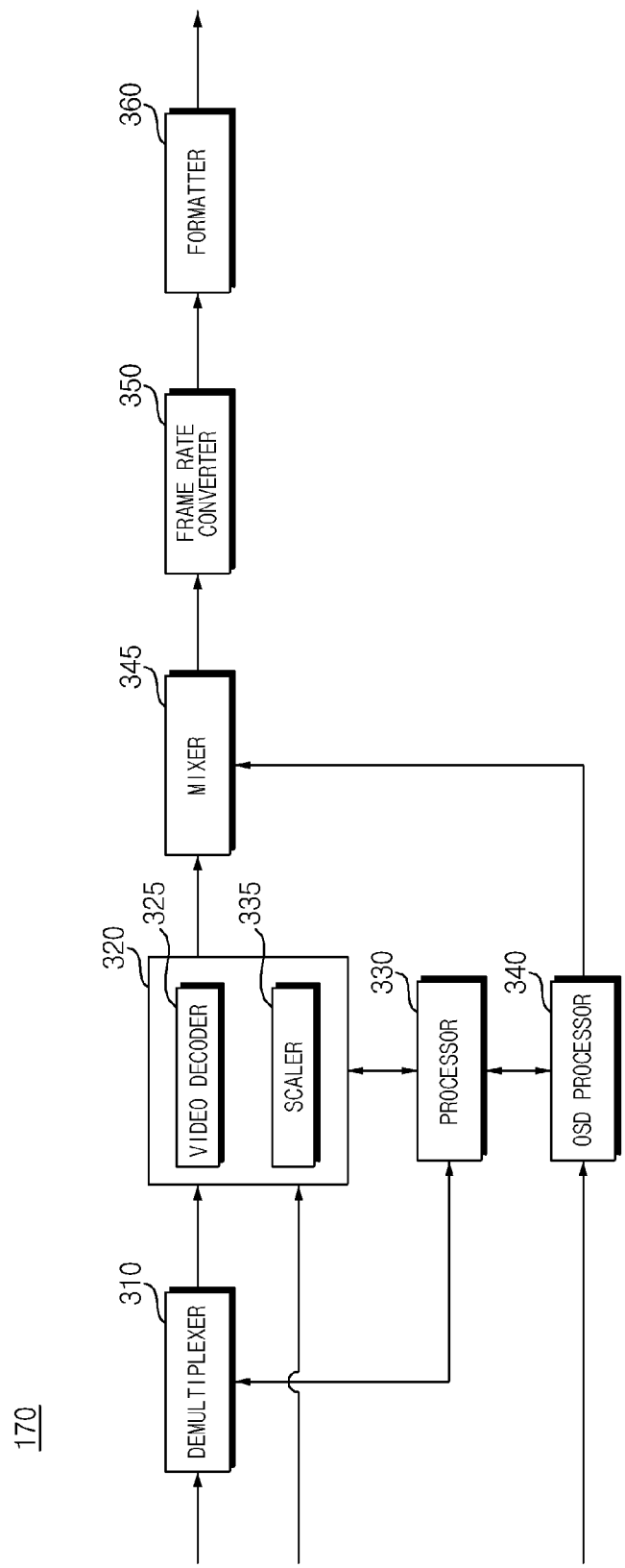

_SIGNAL PROCESSING DEVICE AND IMAGE DISPLAY DEVICE HAVING SAME_

CROSS-REFERENCE TO RELATED APPLICATION(S)

This application is the National Stage filing under 35 U.S.C. 371 of International Application No. PCT/KR2020/005580, filed on Apr. 28, 2020, the contents of which are all incorporated by reference herein in its entirety.

BACKGROUND

1. Field of the Present Disclosure

The present disclosure relates to a signal processing device and an image display apparatus including the same, and more particularly, to a signal processing device and an image display apparatus including the same which can improve performances of burst noise and narrow band noise.

2. Description of the Related Art

A signal processing device is a device for receiving and processing a terrestrial digital broadcasting signal and a mobile communication signal.

The signal processing device receives an RF signal, including noise from a communication channel, via an antenna, and performs signal processing on the received RF signal.

For example, upon the signal processing in the signal processing device, channel state information (CSI) is calculated by assuming that a channel environment is additive white Gaussian noise (AWGN).

However, an actual channel environment does not depend on the additive white Gaussian noise, and has a problem in that the performance deteriorates in a specific channel environment, e.g., impulsive interference or co-channel interference.

In particular, there is a problem in that performance deterioration by burst noise according to the impulse interference or narrow band noise according to the co-channel interference.

SUMMARY

It is an object of the present disclosure to provide a signal processing device and an image display apparatus including the same which can improve performances for burst noise and narrow band noise.

It is another object of the present disclosure to provide a signal processing device and an image display apparatus including the same which can selectively perform time interpolation according to a channel.

It is another object of the present disclosure to provide a signal processing device and an image display apparatus including the same for stably ensuring data even in a mobile channel environment.

In accordance with an aspect of the present disclosure, the above objects can be accomplished by providing a signal processing device and an image display apparatus including the same, including a synchronizer configured to perform a Fourier transform based on the received baseband signal; and an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise.

Meanwhile, in accordance with another aspect of the present disclosure, the above objects can be accomplished by providing a signal processing device and an image display apparatus including the same, including a synchronizer configured to remove a guard band based on the received baseband signal; and an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise.

Effects of the Disclosure

A signal processing device and an image display apparatus including the same according to an embodiment of the present disclosure include a synchronizer performing Fourier transform based on a received baseband signal, and an equalizer computing a channel transfer function value, symbol based noise, and subcarrier frequency based noise based on a signal from the synchronizer, and computing channel state information based on the calculated channel transfer function value, symbol based noise, and subcarrier frequency based noise. As a result, performances for burst noise and narrow band noise can be improved.

Meanwhile, the equalizer may extract a pilot signal from the signal from the synchronizer, and calculate the channel transfer function value based on the extracted pilot signal. As a result, the performances for the bust noise and the narrow band noise may be improved.

Meanwhile, the equalizer may extract the pilot signal from the signal from the synchronizer, and calculate the symbol based noise and the subcarrier frequency based noise based on the extracted pilot signal. As a result, the performances for the bust noise and the narrow band noise may be improved.

Meanwhile, the equalizer may calculate symbol index based noise and subcarrier index based noise based on the signal from the synchronizer. As a result, the performances for the bust noise and the narrow band noise may be improved.

Meanwhile, the equalizer may calculate channel state information which is in proportion to power of the channel transfer function value, which is in inverse proportion to power of the symbol based noise, and which is in inverse proportion to power of the subcarrier frequency based noise. As a result, the performances for the bust noise and the narrow band noise may be improved.

Meanwhile, the equalizer may calculate a log-likelihood ratio based on the channel state information. As a result, the performances for the bust noise and the narrow band noise may be improved.

Meanwhile, the signal processing device and the image display apparatus including the same according to an embodiment of the present disclosure may further include an error corrector performing error correction based on the channel state information. As a result, the performances for the bust noise and the narrow band noise may be improved. Further, the data may be stably ensured.

Meanwhile, the erector corrector may perform the error correction based on a mean square error which increases as a level of the channel state information decreases. As a result, the performances for the bust noise and the narrow band noise may be improved. Further, the data may be stably ensured.

Meanwhile, the equalizer may calculate a channel transfer function value, symbol based noise, and subcarrier frequency based noise based on the signal from the synchronizer, and calculate channel state information based on the calculated channel transfer function value, symbol based noise, and subcarrier frequency based noise. As a result, the time interpolation may be selectively performed according to a channel. In particular, the data may be stably ensured even in the mobile channel environment. In addition, the channel estimation accuracy is improved.

Meanwhile, the equalizer may turn off the time interpolation and perform frequency interpolation in response to a difference in the channel transfer function value of the pilot signal being equal to or more than a reference value between a previous subframe and a current subframe. As a result, in the case of the mobile channel, the time interpolation is turned off to stably ensure the data.

Meanwhile, the equalizer may perform the time interpolation and the frequency interpolation in response to the difference in the channel transfer function value of the pilot signal being less than the reference value between a previous subframe and a current subframe. As a result, in the case of the static channel other than the mobile channel, the time interpolation and the frequency interpolation are performed to stably ensure the data.

Meanwhile, the equalizer may estimate that the channel is the mobile channel in response to the difference in the channel transfer function value of the pilot signal being equal to or more than the reference value between the previous subframe and the current subframe. As a result, in the case of the mobile channel, the time interpolation is turned off to stably ensure the data. In addition, the channel estimation accuracy is improved.

Meanwhile, the equalizer may estimate that the channel is the static channel in response to the difference in the channel transfer function value of the pilot signal being less than the reference value between the previous subframe and the current subframe. As a result, in the case of the static channel, the time interpolation and the frequency interpolation are performed to stably ensure the data. In addition, the channel estimation accuracy is improved.

Meanwhile, the equalizer may determine whether to perform the time interpolation based on the calculated channel transfer function value before performing the time interpolation. As a result, the channel estimation accuracy is improved, and as a result, the data may be stably ensured.

Meanwhile, the equalizer may turn off the time interpolation and perform the frequency interpolation in response to a difference between a representative value of the channel transfer function value of the pilot signal in the previous subframe and the representative value of the channel transfer function of the pilot signal in the current subframe being equal to or more than a reference value. As a result, the time interpolation may be selectively performed according to a channel. In particular, the data may be stably ensured even in the mobile channel environment.

Meanwhile, the reference value may be varied according to the moving speed or mode of the signal processing device. As a result, the time interpolation may be selectively performed according to a channel. In particular, the data may be stably ensured even in the mobile channel environment.

Meanwhile, the equalizer may turn off the time interpolation and perform the frequency interpolation from the next subframe in response to a difference in the channel transfer function value of the pilot signal being equal to or more than a reference value between a previous subframe and a current subframe. As a result, the time interpolation may be selectively performed according to a channel. In particular, the data may be stably ensured even in the mobile channel environment.

Meanwhile, the equalizer may turn off the time interpolation and perform the frequency interpolation from a current subframe in response to a difference in the channel transfer function value of the pilot signal being equal to or more than a reference value between a previous subframe and a current subframe. As a result, the time interpolation may be selectively performed according to a channel. In particular, the data may be stably ensured even in the mobile channel environment.

Meanwhile, the equalizer may turn off the time interpolation and changes an off time of the time interpolation according to the moving speed or mode of the signal processing device, in response to the difference in the channel transfer function value of the pilot signal being equal to or more than the reference value between the previous subframe and the current subframe. By varying the off time, the data may be stably ensured adaptively to the moving speed or mode.

Meanwhile, when the first subframe and the second subframe in one frame have different transport formats, the equalizer may perform control to make the threshold for the first subframe and the threshold for the second subframe different from each other. By varying the threshold based on transport formats, the data may be stably ensured. In addition, the channel estimation accuracy is improved.

Meanwhile, the synchronizer may remove a cyclic prefix based on the received baseband signal before the Fourier transform and remove a guard band after the Fourier transform. Further, the data may be stably ensured.

Meanwhile, the synchronizer may perform timing restoration based on the received baseband signal before removing the cyclic prefix. Further, the data may be stably ensured.

Meanwhile, a signal processing device and an image display apparatus including the same according to another embodiment of the present disclosure include an equalizer computing a channel transfer function value, symbol based noise, and subcarrier frequency based noise based on a signal from a synchronizer, and computing channel state information based on the calculated channel transfer function value, symbol based noise, and subcarrier frequency based noise. As a result, performances for burst noise and narrow band noise can be improved.

BRIEF DESCRIPTION OF THE DRAWINGS

FIG. 4 is an internal block diagram of the controller of FIG. 3;

DETAILED DESCRIPTION OF THE PREFERRED EMBODIMENTS

Hereinafter, embodiments of the present disclosure will be described in further detail with reference to the accompanying drawings.

In the following description, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
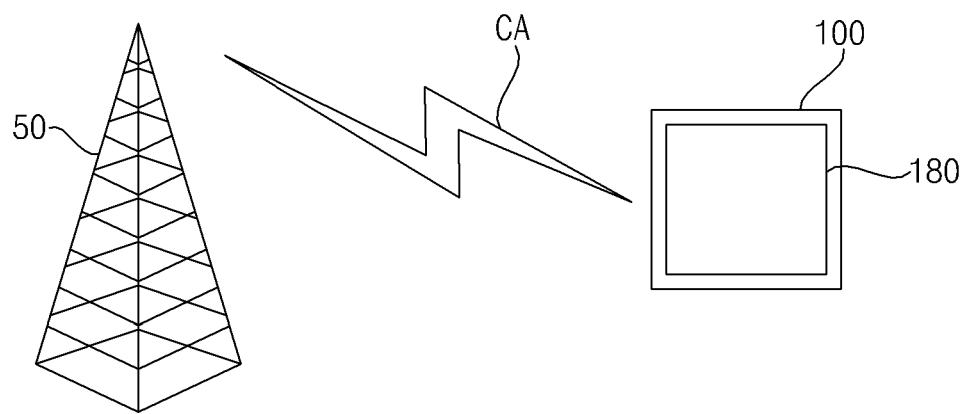
FIG. 1 is a diagram illustrating a radio frequency (RF) signal receiving system according to an embodiment of the present disclosure.

FIG. 1 is a diagram illustrating a radio frequency (RF) signal receiving system according to an embodiment of the present disclosure.

Referring to FIG. 1, an RF signal receiving system 10 according to an embodiment of the present disclosure may include a wireless signal transmitting device 10 for transmitting an RF signal CA, and a wireless reception device 80 for receiving the RF signal CA.

The RF reception device 80 according to an embodiment of the present disclosure may be an RF reception device that does not depend on additive white Gaussian noise, and may reduce performance deterioration by burst noise or performance deterioration by narrow band noise in a specific channel environment, e.g., impulsive interference or co-channel interference.

To this end, the RF reception device 80 (in FIG. 9A) according to an embodiment of the present disclosure may include a synchronizer 521 (in FIG. 9B) performing Fourier transform based on a received baseband signal, and a signal processing device 520 (in FIG. 9B) including an equalizer 523 (in FIG. 9B) computing a channel transfer function value, symbol based noise, and subcarrier frequency based noise based on a signal from the synchronizer, and computing channel state information based on the calculated channel transfer function value, symbol based noise, and subcarrier frequency based noise. As a result, performances for burst noise and narrow band noise can be improved.

Meanwhile, the RF reception device 80 (in FIG. 9A) according to another embodiment of the present disclosure may include a synchronizer 521 (in FIG. 9B) removing a guard band based on a received baseband signal, and a signal processing device 520 (in FIG. 9B) including an equalizer 523 (in FIG. 9B) computing a channel transfer function value, symbol based noise, and subcarrier frequency based noise based on a signal from the synchronizer, and computing channel state information based on the calculated channel transfer function value, symbol based noise, and subcarrier frequency based noise. As a result, performances for burst noise and narrow band noise can be improved.

The RF signal CA of FIG. 1 may be a digital broadcasting signal, and in this case, the RF receiving device 80 of FIG. 1 may be included in an image display device 100 (refer to FIG. 2A) such as a TV or a mobile terminal 100b (refer to FIG. 2B) such as a cellular phone or a tablet terminal.

The RF signal CA may be a broadcasting signal based on the ATSC 3.0 standard.

Figure 2A:
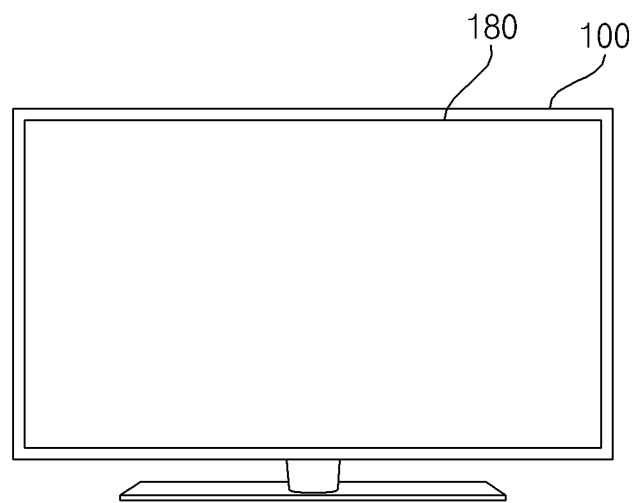
FIG. 2A is a diagram showing an example of an image display apparatus according to an embodiment of the present disclosure.

FIG. 2A is a diagram showing an example of an image display apparatus according to an embodiment of the present disclosure.

Referring to FIG. 2A, the image display apparatus 100 of FIG. 2A may include a display 180 and may also include the RF receiving device 80 described with reference to FIG. 1.

An image display apparatus 100 in FIG. 2A may include a signal processing device performing Fourier transform based on a received baseband signal, and computing a channel transfer function value, symbol based noise, and subcarrier frequency based noise, and computing channel state information based on the calculated channel transfer function value, symbol based noise, and subcarrier frequency based noise after performing the Fourier transform.

As a result, performances for burst noise and narrow band noise can be improved.

Meanwhile, an image display apparatus 100 in FIG. 2A may include a signal processing device removing a guard band based on a received baseband signal, and computing a channel transfer function value, symbol based noise, and subcarrier frequency based noise, and computing channel state information based on the calculated channel transfer function value, symbol based noise, and subcarrier frequency based noise after removing the guard band.

As a result, performances for burst noise and narrow band noise can be improved.

Figure 2B:
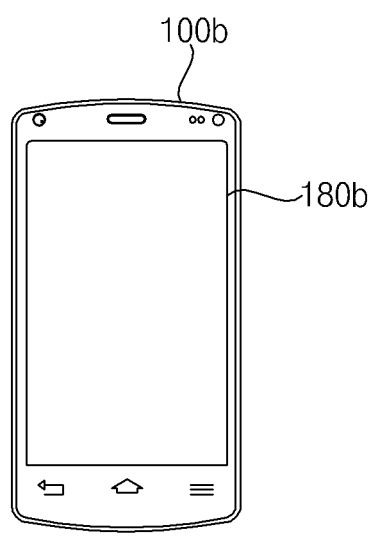
FIG. 2B is a diagram showing another example of an image display apparatus according to an embodiment of the present disclosure.

FIG. 2B is a diagram illustrating another example of an image display apparatus according to an embodiment of the present disclosure.

Referring to FIG. 2B, a mobile terminal 100b of FIG. 2B may include a display 180b, and further, include the RF reception device 80 described in FIG. 1.

The mobile terminal 100b in FIG. 2B may include a signal processing device performing Fourier transform based on a received baseband signal, and computing a channel transfer function value, symbol based noise, and subcarrier frequency based noise, and computing channel state information based on the calculated channel transfer function value, symbol based noise, and subcarrier frequency based noise after performing the Fourier transform.

As a result, performances for burst noise and narrow band noise can be improved.

Meanwhile, the image display apparatus 100B in FIG. 2B may include a signal processing device removing a guard band based on a received baseband signal, and computing a channel transfer function value, symbol based noise, and subcarrier frequency based noise, and computing channel state information based on the calculated channel transfer function value, symbol based noise, and subcarrier frequency based noise after removing the guard band.

As a result, performances for burst noise and narrow band noise can be improved.

Figure 3:
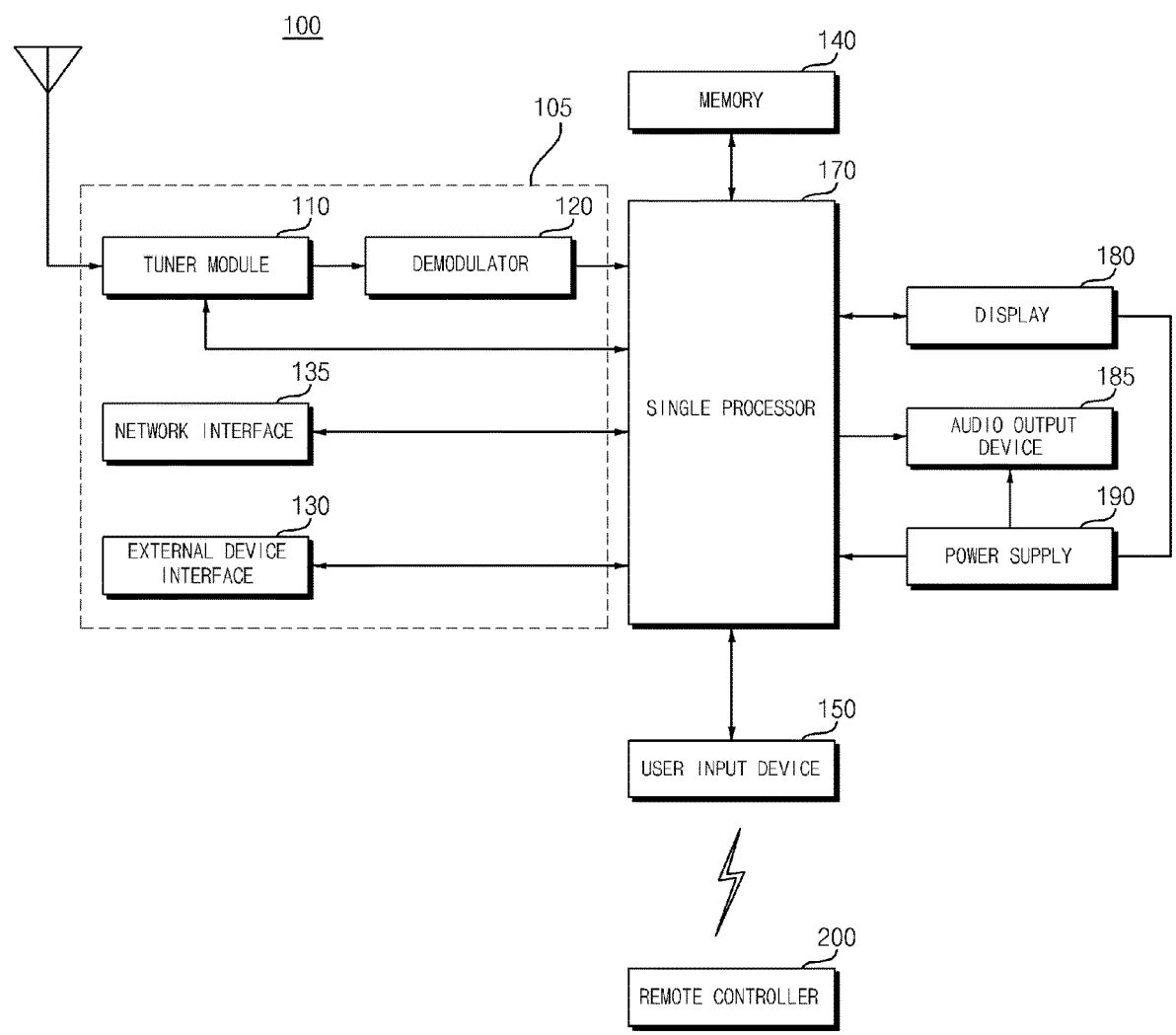
FIG. 3 is an internal block diagram of the image display apparatus of FIG. 2A.

FIG. 3 is an internal block diagram of the image display apparatus of FIG. 2A.

Referring to FIG. 3, the image display apparatus 100 according to an embodiment of the present disclosure comprises a broadcast receiver 105, an external device interface 130, a memory 140, a user input interface 150, a sensor device (not shown), a signal processor, the display 180, and an audio output device 185.

The broadcast receiver 105 includes a tuner module 110, a demodulator 120, a network interface 135, and an external device interface 130.

Unlike the embodiment of FIG. 3, the demodulator 120 may be included in the tuner module 110.

Further, unlike the embodiment of FIG. 3, the broadcast receiver 105 may include only the tuner module 110, the demodulator 120, and the external interface 135, i.e., without including the network interface 135.

The tuner module 110 may tune a Radio Frequency (RF) broadcast signal corresponding to a channel selected by a user or all the previously stored channels, among RF broadcast signals received via an antenna (not shown). In addition, the tuner module 110 may convert the tuned RF broadcast signal into an intermediate frequency signal or a baseband signal (baseband image signal or baseband audio signal).

For example, if the selected RF broadcast signal is a digital broadcast signal, the tuner module 110 converts the digital broadcast signal into a digital IF signal (DIF), and if the selected RF broadcast signal is an analog broadcast signal, the tuner module 110 converts the analog broadcast signal into a baseband image or an audio signal (CVBS/SIF). That is, the tuner module 110 may process the digital broadcast signal or the analog broadcast signal. The analog baseband image or the audio signal (CVBS/SIF), which is output from the tuner module 110, may be directly input to the signal processor.

The tuner module 110 may include a plurality of tuners to receive broadcast signals of a plurality of channels. Alternatively, the tuner module 110 may be a single tuner which receives broadcast signals of a plurality of channels simultaneously.

The demodulator 120 may receive the digital IF (DIF) signal converted by the tuner module 110, and may demodulate the digital IF signal.

For example, the demodulator 120 may convert the digital IF (DIF) signal, which is converted by the tuner module 110, into a baseband signal.

Upon performing demodulation and channel decoding, the demodulator 120 may output a stream signal (TS). Here, the stream signal may be a signal obtained by multiplexing an image signal, an audio signal, or a data signal.

The stream signal, output from the demodulator 120, may be input into the signal processor. Upon performing demultiplexing, A/V signal processing, and the like, the signal processor may output video to the display 180 and audio to the audio output device 185.

The external device interface 130 may be connected to an external device (not shown), e.g., a set-top box 50, to transmit or receive data. To this end, the external device interface 130 may include an A/V input and output device (not shown).

The external device interface 130 may be connected, wirelessly or by wire, to an external device, such as a digital versatile disk (DVD), a Blu-ray, a game console, a camera, a camcorder, a calculator (laptop calculator), a set-top box, and the like, and may perform an input/output operation with the external device.

The A/V input/output device may receive input of image and audio signals of the external device. A wireless communicator (not shown) may perform short range wireless communication with other electronic devices.

By connection with such wireless communicator (not shown), the external device interface 130 may exchange data with an adjacent mobile terminal 160. Particularly, in a mirroring mode, the external device interface 130 may receive device information, information on executed applications, application images, and the like from the mobile terminal 600.

The network interface 135 serves as an interface for connecting the image display apparatus 100 and a wired or wireless network such as the Internet. For example, the network interface 135 may receive contents or data from the Internet, a content provider, or a network operator over a network.

Further, the network interface 135 may include the wireless communicator (not shown).

The memory 140 may store programs for processing and controlling each signal by the signal processor, or may store processed video, audio, or data signals.

In addition, the memory 140 may also temporarily store video, audio, or data signals input via the external device interface 130. Furthermore, the memory 140 may store information related to a predetermined broadcast channel using a channel memory function of a channel map and the like.

While FIG. 3 illustrates an example where the memory 140 is separately provided from the signal processor, the present disclosure is not limited thereto, and the memory 140 may be included in the signal processor.

The user input interface 150 transmits a signal, input by a user, to the signal processor, or transmits a signal from the signal processor to the user.

For example, the user input interface 150 may transmit/receive user input signals, such as a power on/off signal, a channel selection signal, a screen setting signal, and the like, to and from a remote controller 200; may transfer a user input signal, which is input from a local key (not shown), such as a power key, a channel key, a volume key, or a setting key, to the signal processor; may transfer a user input signal, which is input from a sensor device (not shown) for sensing a user's gesture, to the signal processor; or may transmit a signal from the signal processor to the sensor device (not shown).

The signal processor may demultiplex stream, which is input via the tuner module 110, the demodulator 120, a network interface 135, or the external interface 130, or may process the demultiplexed signals, to generate and output signals for outputting video or audio.

The video signal processed by the signal processor may be input to the display 180 to be output as a video corresponding to the video signal. Further, the video signal processed by the signal processor may be input to an external output device via the external device interface 130.

The audio signal processed by the signal processor may be output to the audio output device 185. Further, the audio signal processed by the signal processor may be input to the external output device through the external device interface 130.

Although not illustrated in FIG. 3, the signal processor may include a demultiplexer, a video processor, and the like, which will be described later with reference to FIG. 4.

In addition, the signal processor may control the overall operation of the image display apparatus 100. For example, the signal processor may control the tuner module 110 to tune to an RF broadcast corresponding to a user selected channel or a prestored channel.

Further, the signal processor may control the image display apparatus 100 by a user command input via the user input interface 150 or an internal program.

For example, the signal processor may control the display 180 to display an image. In this case, the image displayed on the display 180 may be a still image or a video, or a 2D or 3D image.

In addition, the signal processor may control the display 180 to display a predetermined object in the displayed image. For example, the object may be at least one of an accessed web screen (newspaper, magazine, etc.), an Electronic Program Guide (EPG), various menus, a widget, an icon, a still image, a video, or text.

The signal processor may recognize a user's location based on an image captured by a capturing device (not shown). For example, the signal processor may recognize a distance (z-axial coordinates) between the user and the image display apparatus 100. Also, the signal processor may recognize x-axial coordinates and y-axial coordinates in the display 180 corresponding to the user's location.

The display 180 converts a video signal, a data signal, an OSD signal, a control signal which are processed by the signal processor, or a video signal, a data signal, a control signal, and the like which are received via the external device interface 130, to generate a driving signal.

Further, the display 180 may be implemented as a touch screen to be used as an input device as well as an output device.

The audio output device 185 may output sound by receiving an audio signal processed by the signal processor.

The capturing device (not shown) captures a user's image. The capturing device (not shown) may be implemented with a single camera, but is not limited thereto, and may be implemented with a plurality of cameras. The image information captured by the capturing device (not shown) may be input to the signal processor.

The signal processor may sense a user's gesture based on the image captured by the capturing device (not shown), a signal sensed by the sensor device (not shown), or a combination thereof.

The power supply 190 may supply power throughout the image display apparatus 100. Particularly, the power supply 190 may supply power to the signal processor which may be implemented in a form of a system on chip (SOC), the display 180 to display an image, and the audio output device 185 to output an audio.

Specifically, the power supply 190 may include a converter which converts an alternating current into a direct current, and a dc/dc converter which converts the level of the direct current.

The remote controller 200 transmits a user input to the user input interface 150. To this end, the remote controller 200 may use various communication techniques, such as Bluetooth, RF communication, IR communication, Ultra Wideband (UWB), ZigBee, and the like. Further, the remote controller 200 may receive video, audio, or data signals output from the user input interface 150, to display the signals on the remote controller 200 or output the signal thereon in the form of sound.

The above described image display apparatus 100 may be a fixed or mobile digital broadcast receiver capable of receiving digital broadcast.

The block diagram of the image display apparatus 100 illustrated in FIG. 3 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

FIG. 4 is an internal block diagram of the controller of FIG. 3.

Referring to FIG. 4, the signal processor according to an embodiment of the present disclosure comprises a demultiplexer 310, a video processor 320, a processor 330, an OSD processor 340, a mixer 345, a frame rate converter 350, and a formatter 360. In addition, the processor 170 may further include an audio processor (not shown) and a data processor (not shown).

The demultiplexer 310 demultiplexes an input stream. For example, the demultiplexer 310 may demultiplex an MPEG-2 TS into a video signal, an audio signal, and a data signal. Here, the stream signal input to the demultiplexer 310 may be a stream signal output from the tuner module 110, the demodulator 120, or the external device interface 130.

The video processor 320 may process the demultiplexed video signal. To this end, the video processor 320 may include a video decoder 325 and a scaler 335.

The video processor 325 decodes the demultiplexed video signal, and the scaler 335 scales resolution of the decoded video signal so that the video signal may be displayed on the display 180.

The video decoder 325 may include decoders of various standards. Examples of the video decoder 325 may include an MPEG-2 decoder, an H.264 decoder, a 3D video decoder for decoding a color image and a depth image, a decoder for decoding an image having a plurality of viewpoints, and the like.

The processor 330 may control the overall operation of the image display apparatus 100 or the signal processor. For example, the processor 330 controls the tuner module 110 to tune to an RF signal corresponding to a channel selected by the user or a previously stored channel.

The processor 330 may control the image display apparatus 100 by a user command input through the user input interface 150 or an internal program.

Further, the processor 330 may control data transmission of the network interface 135 or the external device interface 130.

In addition, the processor 330 may control the operation of the demultiplexer 310, the video processor 320, the OSD processor 340 of the signal processor, and the like.

The OSD processor 340 generates an OSD signal autonomously or according to user input. For example, the OSD processor 340 may generate signals by which various types of information are displayed as graphics or text on the display 180 according to a user input signal. The generated OSD signal may include various data such as a User Interface (UI), various menus, widgets, icons, etc. Further, the generated OSD signal may include a 2D object or a 3D object.

The OSD processor 340 may generate a pointer which can be displayed on the display according to a pointing signal received from the remote controller 200. Particularly, such pointer may be generated by a pointing signal processor, and the OSD processor 340 may include such pointing signal processor (not shown). Alternatively, the pointing signal processor (not shown) may be provided separately from the OSD processor 340 without being included therein.

The mixer 345 may mix the OSD signal generated by the OSD processor 340 and the decoded video signal processed by the video processor 320. The mixed video signal is provided to the frame rate converter 350.

The frame rate converter (FRC) 350 may convert a frame rate of an input video. The frame rate converter 350 may output the input video as it is without converting the frame rate.

The formatter 360 may change the format of an input image signal into an image signal for displaying on the display 180 and output the changed image signal.

The formatter 360 may convert the format of a video signal. For example, the formatter 360 may convert the format of a 3D image signal into any one of various 3D formats, such as a side by side format, a top down format, a frame sequential format, an interlaced format, a checker box format, and the like.

The audio processor (not shown) in the signal processor may process the demultiplexed audio signal, or an audio signal of a predetermined content. To this end, the audio processor 370 may include various decoders.

Further, the audio processor (not shown) in the signal processor may also adjust the bass, treble, or volume of the audio signal.

A data processor (not shown) in the signal processor may process the demultiplexed data signal. For example, when the demultiplexed data signal is encoded, the data processor may decode the encoded demultiplexed data signal. Here, the encoded data signal may be Electronic Program Guide (EPG) information including broadcast information such as the start time and end time of a broadcast program which is broadcast through each channel.

The block diagram of the signal processor illustrated in FIG. 4 is by example. The components of the block diagrams may be integrated or omitted, or a new component may be added according to the specifications of the signal processor.

Particularly, the frame rate converter 350 and the formatter 360 may not be included in the signal processor but may be provided individually, or may be provided separately as one module.

Figure 5A:
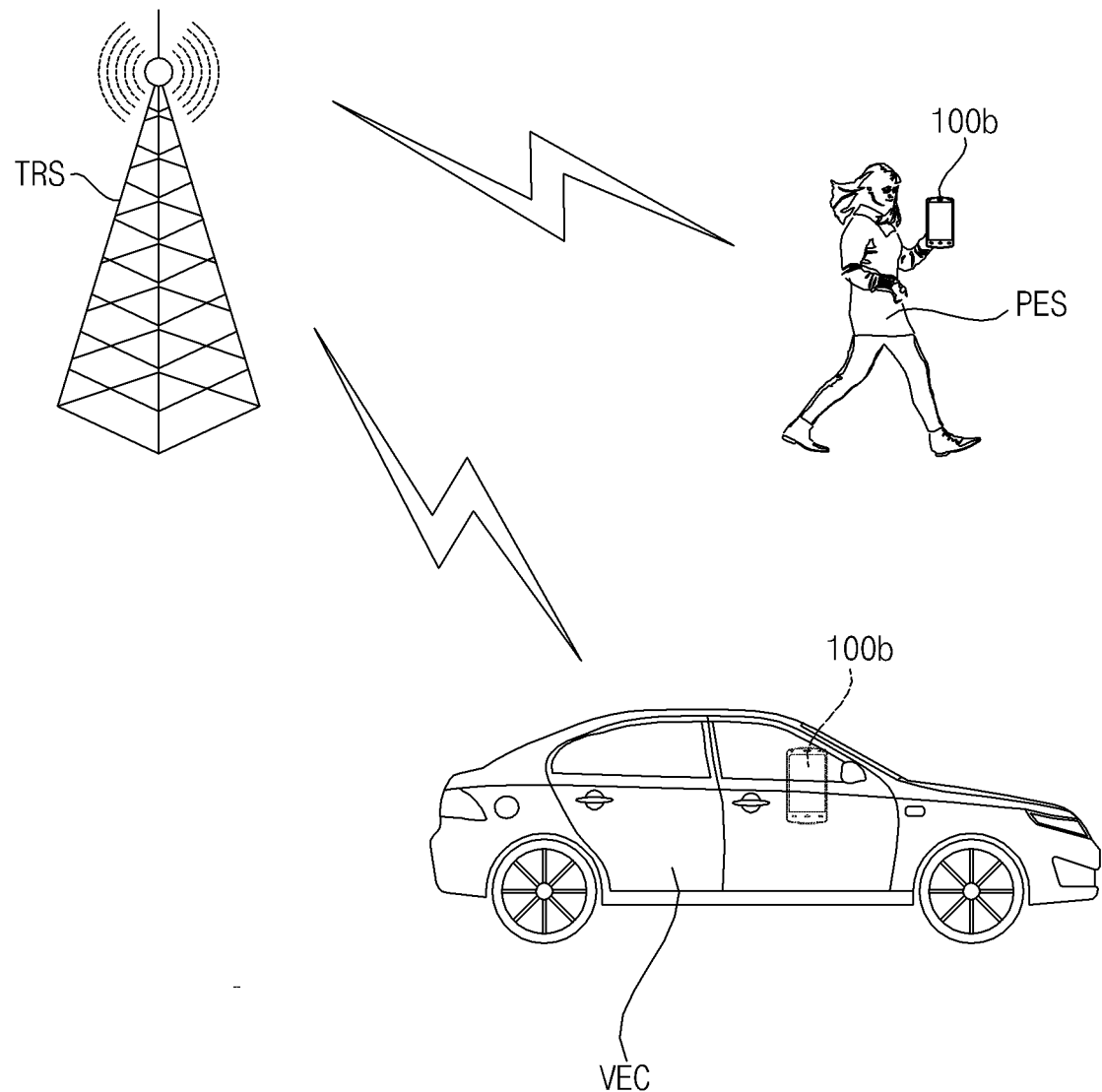
FIGS. 5A to 5B are diagrams for explaining a static channel and a mobile channel.
Figure 5B:
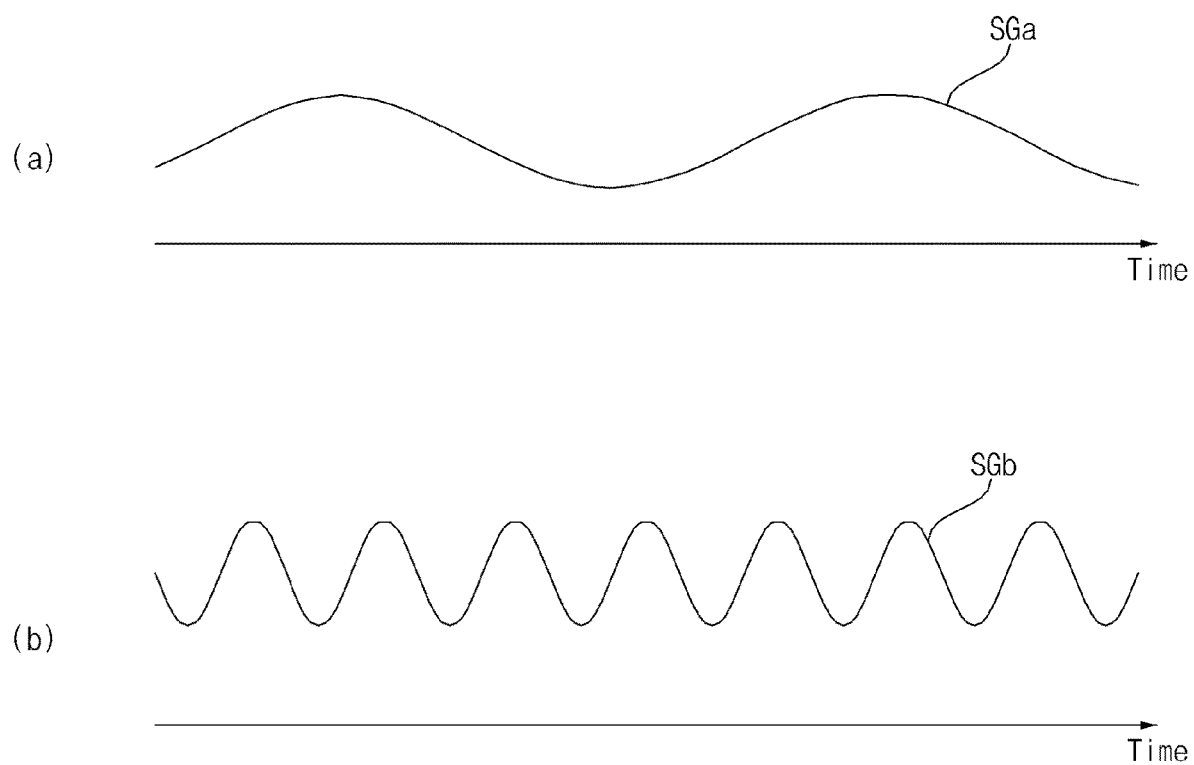

FIGS. 5A to 5B are diagrams for explaining a static channel and a mobile channel.

First, FIG. 5A illustrates an example in which an RF signal output from a base station TRS is received by a mobile terminal 100b of a pedestrian PES or is received by the mobile terminal 100b inside a vehicle VEC.

The mobile terminal 100b of the pedestrian PES may receive the RF signal through a static channel, and the mobile terminal 100b inside the vehicle VEC may receive the RF signal through a mobile channel.

(a) of FIG. 5B is a diagram illustrating an example of a Doppler frequency signal SGa in a static channel. (b) of FIG. 5B is a diagram illustrating an example of a Doppler frequency signal SGb in a mobile channel.

As shown in FIG. 5B, the frequency of the Doppler frequency signal SGb in the mobile channel is higher than the frequency of the Doppler frequency signal SGa in the static channel.

For example, when the moving speed of the pedestrian PES of FIG. 5A is about 4 Km/h, the RF signal may correspond to the Doppler frequency signal SGa in the static channel as shown in (a) of FIG. 5B, and when the moving speed of the vehicle VEC of FIG. 5A is about 80 Km/h, the RF signal may correspond to the Doppler frequency signal SGb in the mobile channel as shown in FIG. 5B.

Meanwhile, the mobile channel as a channel in which a channel state quickly changes in a wireless transmission channel may be a time-varying fading channel.

Figure 6A:
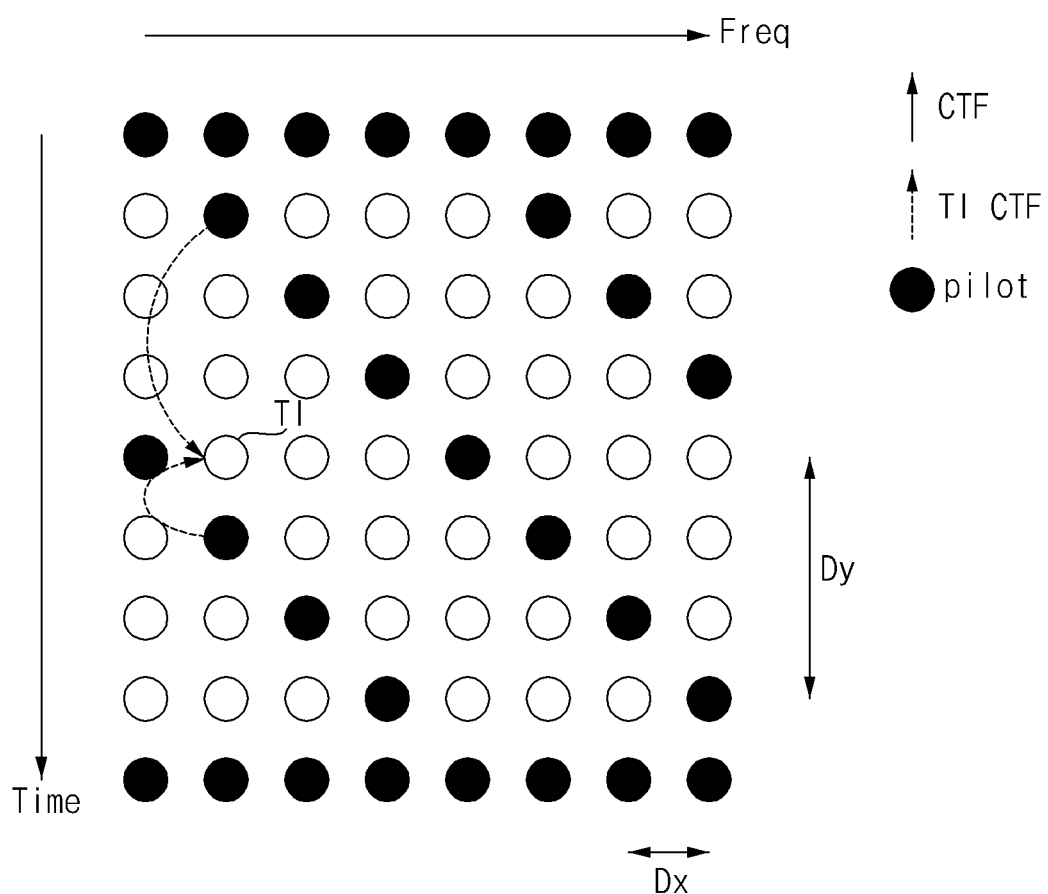
FIGS. 6A to 6C are diagrams for explaining interpolation based on a pilot signal.

FIG. 6A is a diagram for explaining interpolation in the frequency domain and the time domain when an RF signal is an RF signal based on an orthogonal frequency division multiplexing (OFDM) method.

Referring to FIG. 6A, when a pilot signal is extracted from the RF signal, the pilot signal may be indicated in a pilot pattern in the frequency domain on the horizontal axis and the time domain on the vertical axis.

The signal processing device 520 may perform frequency interpolation in a horizontal direction and time interpolation in the vertical direction based on the pilot signal or the pilot pattern.

The signal processing device 520 may acquire an effective symbol or effective data in the RF signal based on this interpolation or the like.

The mobile channel detected by the signal processing device 520 may correspond to a channel that is changed over time due to the Doppler frequency (Doppler speed).

In this case, the channel is changed more over time as the Doppler frequency increases, and thus a channel change between symbols on the time axis in an OFDM symbol may be increased.

The signal processing device 520 may determine a channel change over time using a channel transfer function value of a pilot symbol positioned at an interval dy of the time axis in an OFDM symbol.

Figure 6B:
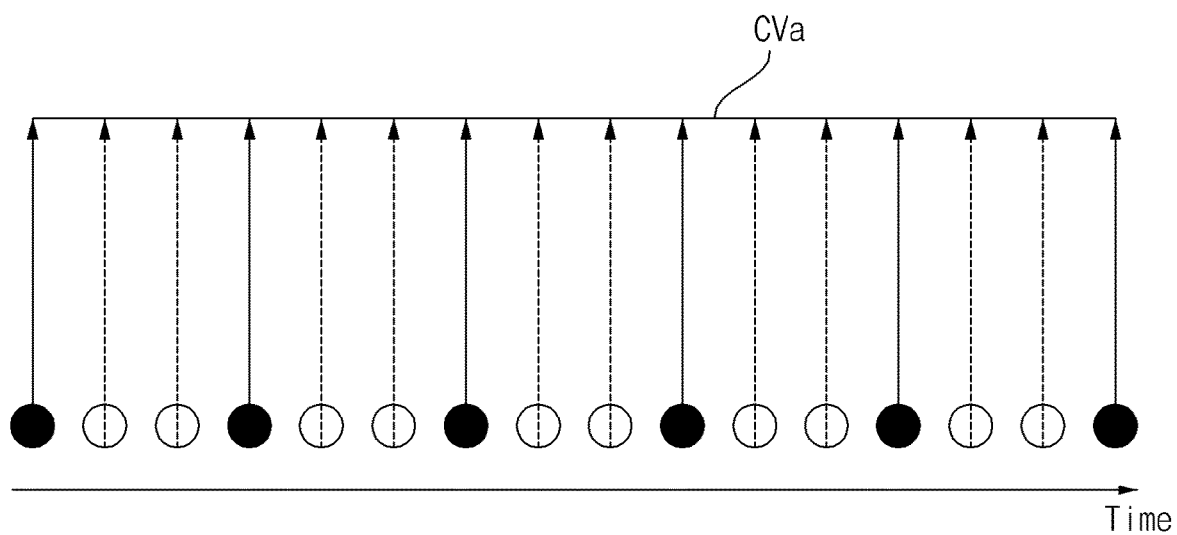

FIG. 6B is a diagram showing an example of time interpolation in a static channel.

Referring to FIG. 6B, the signal processing device 520 may restore a signal CVa corresponding to the static channel by performing time interpolation based on the pilot signal or the pilot pattern.

Figure 6C:
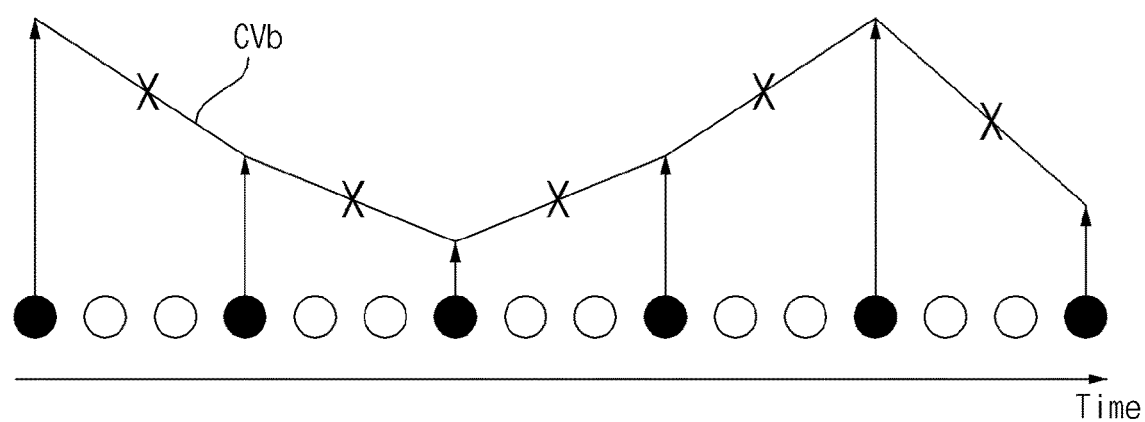

FIG. 6C is a diagram showing an example of time interpolation in a mobile channel.

Referring to FIG. 6C, the signal processing device 520 may restore a signal CVb corresponding to the mobile channel by performing time interpolation based on the pilot signal or the pilot pattern.

In this case, in the mobile channel, when time interpolation is performed, it may be difficult to restore an accurate signal, and accuracy may be remarkably lowered. Thus, in the mobile channel, time interpolation may not be performed.

Figure 7:
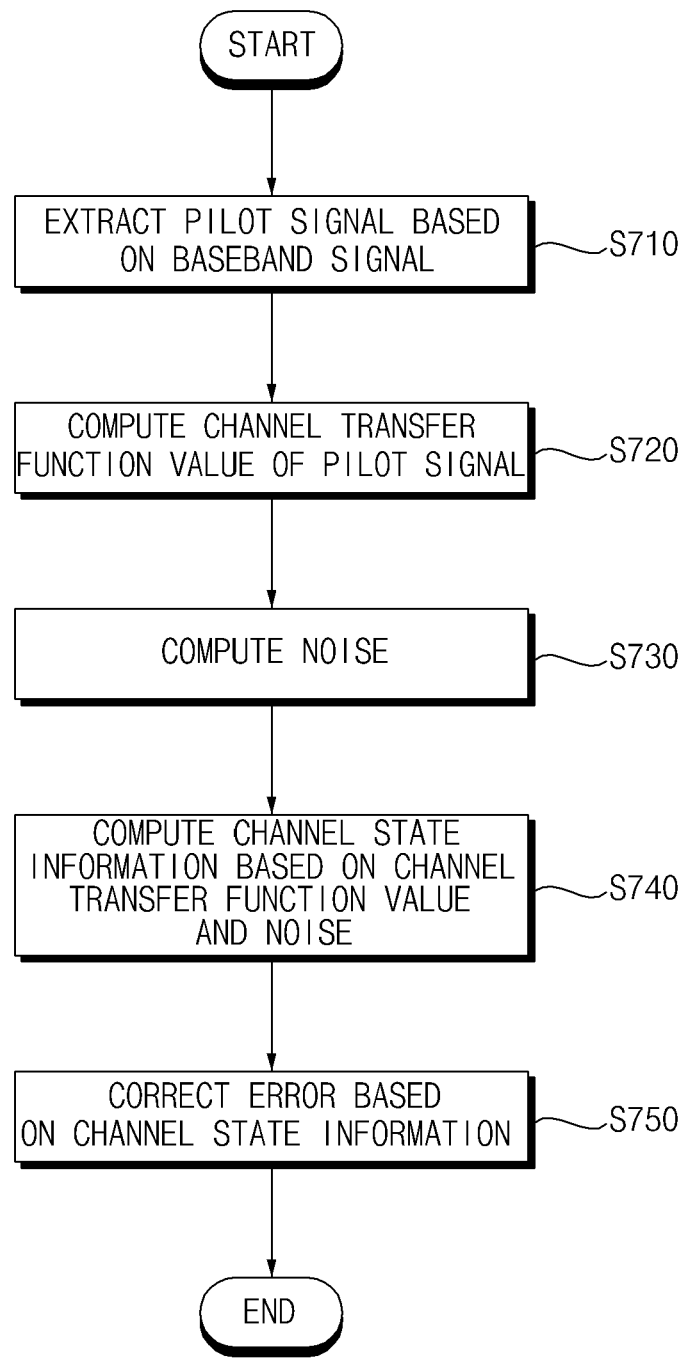
FIG. 7 is a flowchart of a method of operating a signal processing device related to the present disclosure.

FIG. 7 is a flowchart of a method of operating a signal processing device related to the present disclosure.

Referring to FIG. 7, the signal processing device 520 may extract a pilot signal based on a baseband signal (S710).

In addition, the signal processing device 520 calculates the channel transfer function value based on the pilot signal (S720).

For example, the signal processing device 520 may calculate frequency and time based channel transfer function values based on the pilot signal as illustrated in FIG. 6A.

Specifically, the signal processing device 520 may calculate subcarrier frequency based and symbol based channel transfer function values based on the pilot signal as illustrated in FIG. 6A.

Here, the channel transfer function value may be a Channel Transfer Function value or a CTF value.

Then, the signal processing device 520 calculates noise (S730).

For example, the signal processing device 520 calculates noise by assuming that channel noise is additive white Gaussian noise (AWGN).

Then, the signal processing device 520 calculates channel state information (CSI) based on the calculated channel transfer function value and noise (S740). In addition, the signal processing device 520 performs error correction based on the channel state information (S750).

Equation 1 below is an equation showing a relationship between a received signal, and a channel and noise.

$$y = Hx + n \qquad \text{[Equation 1]}$$

Here, y as the received signal may be a baseband signal input into the signal processing device 520. In addition, H may represent the channel transfer function, x may represent a transmitted signal, and n may represent channel noise.

According to FIG. 7, the signal processing device 520 utilizes Equation 2 below to calculate the channel state information.

$$CSI = \frac{|H_{l,k}|^2}{\sigma^2} \qquad \text{[Equation 2]}$$

Here, $H_{l,k}$ represents the channel transfer function, and $\sigma$ as the channel noise represents the additive white Gaussian noise.

In this case, l represents an OFDM symbol index and k represents a subcarrier index.

That is, according to Equation 2, the channel state information is in proportion to a square of the channel transfer function value, and in inverse proportion to the square of the additive white Gaussian noise.

In addition, the signal processing device 520 performs the error correction based on the channel state information calculated by Equation 2.

However, an actual channel environment does not depend on the additive white Gaussian noise, and has a problem in that the performance deteriorates in a specific channel environment, e.g., impulsive interference or co-channel interference.

In particular, there is a problem in that performance deterioration by burst noise according to the impulse interference or narrow band noise according to the co-channel interference.

Therefore, the present disclosure a method that does not depend on the additive white Gaussian noise, and may reduce performance deterioration by burst noise or performance deterioration by narrow band noise in a specific channel environment, e.g., impulsive interference or co-channel interference. This will be described with reference to FIG. 8 and below.

Figure 8:
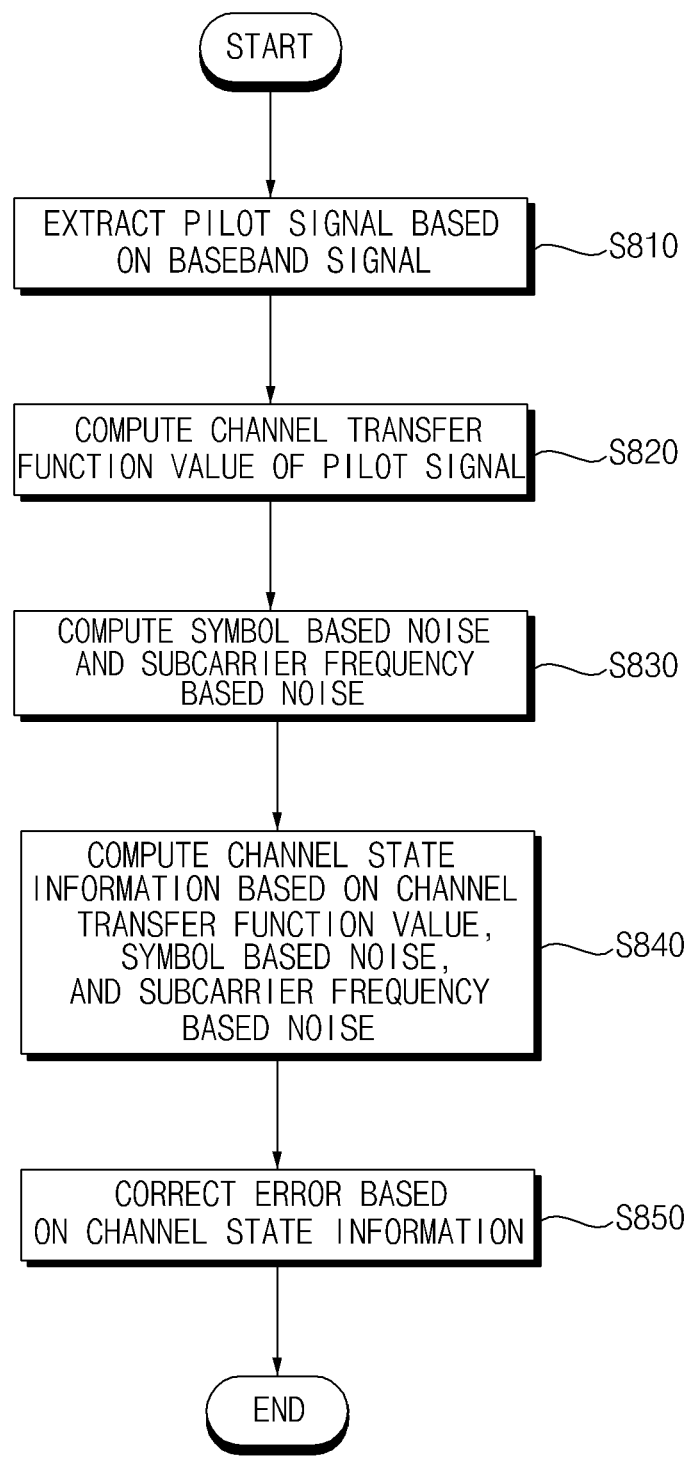
FIG. 8 is a flowchart of a method of operating a signal processing device according to an embodiment of the present disclosure.

FIG. 8 is a flowchart of an operation of a signal processing device according to an embodiment of the present invention.

Referring to FIG. 8, the signal processing device 520 extracts the pilot signal based on the baseband signal (S810).

In addition, the signal processing device 520 calculates the channel transfer function value based on the pilot signal (S820).

For example, the signal processing device 520 may calculate frequency and time based channel transfer function values based on the pilot signal as illustrated in FIG. 6A.

Specifically, the signal processing device 520 may calculate subcarrier frequency based and symbol based channel transfer function values based on the pilot signal as illustrated in FIG. 6A.

Here, the channel transfer function value may be a Channel Transfer Function value or a CTF value.

Meanwhile, the channel transfer function may be expressed as $H_{l,k}$, and in this case, l may represent an OFDM symbol index and k may represent the subcarrier index.

That is, the signal processing device 520 may calculate the channel transfer function values for each OFDM symbol index and for each subcarrier index.

Then, the signal processing device 520 calculates symbol based noise and carrier frequency based noise (S830).

For example, the signal processing device 520 may calculate symbol based noise $\sigma_l$ in relation to the burst noise according to the impulsive interference. In this case, l represents the OFDM symbol index.

As another example, the signal processing device 520 may calculate subcarrier frequency based noise $\sigma_k$ in relation to the narrow band noise according to the co-channel interference. In this case, k represents the subcarrier index.

Then, the signal processing device 520 calculates the channel state information based on the calculated channel transfer function value, symbol based noise, and subcarrier frequency based noise (S840).

In addition, the signal processing device 520 performs the error correction based on the calculated channel state information (S850).

The signal processing device 520 may calculate the channel state information by using Equation 3 below.

$$CSI = E[\sigma_k^2] \frac{|H_{l,k}|^2}{\sigma_k^2} \frac{E[\sigma_l^2]}{\sigma_l^2} \qquad \text{[Equation 3]}$$

Here, $H_{l,k}$ represents the channel transfer function, $\sigma_l$ represents the symbol based noise, and $\sigma_k$ represents the subcarrier frequency based noise.

That is, the signal processing device 520 may calculate channel state information (CSI) which is in proportion to power $\sigma_1^2$ the channel transfer function $H_{l,k}$, which is in inverse proportion to power $\sigma_l^2$ of the symbol based noise $\sigma_l$, and which is in inverse proportion to power $\sigma_l^2$ of the subcarrier frequency based noise $\sigma_k$.

As a result, when computing the channel state information (CSI), it is possible to accurately calculate the channel state information by considering contents regarding the burst noise and the narrow band noise.

Meanwhile, the signal processing device 520 performs the error correction based on the accurate channel state information to improve the performances for the burs noise and the narrow band noise.

Figure 9A:
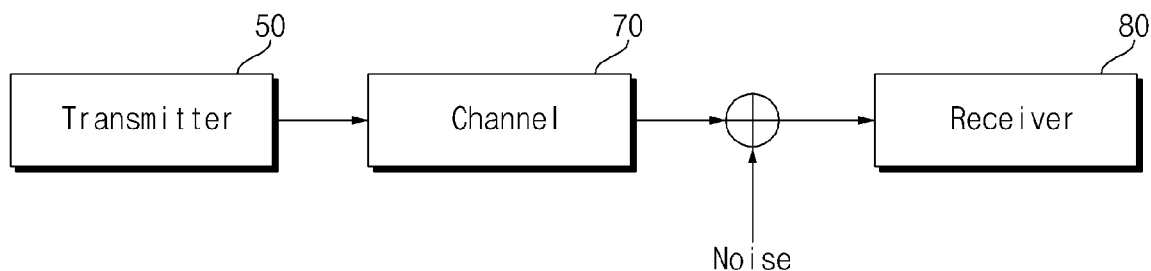
FIG. 9A is a block diagram illustrating an RF signal receiving system according to an embodiment of the present disclosure.

FIG. 9A is a block diagram illustrating an RF signal receiving system according to an embodiment of the present disclosure.

Referring to FIG. 9A, the RF signal receiving system 10 according to an embodiment of the present disclosure may include the wireless signal transmitting device 10 for transmitting an RF signal CA, and the RF receiving device 80 for receiving the RF signal CA.

A noise signal, derived from a channel 70, may be added to the RF signal CA transmitted by the wireless signal transmitting device 10, and the wireless reception device 80 may receive the RF signal CA, to which the noise signal is added.

Figure 9B:
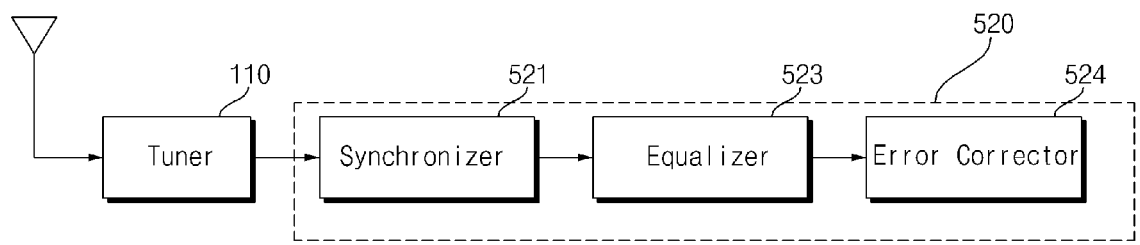
FIG. 9B is a block diagram illustrating an example of an RF receiving device according to an embodiment of the present disclosure.

FIG. 9B is a block diagram illustrating an example of an RF receiving device according to an embodiment of the present disclosure.

Referring to FIG. 9B, the RF receiving device 80a according to an embodiment of the present disclosure may include the tuner module 110 for receiving an RF signal including noise of a channel and converting the RF signal into a baseband signal, and the signal processing device 520 for performing signal processing on the baseband signal.

In this case, the tuner module 110 may also function as a demodulator. Alternatively, the RF receiving device 80*a* may also function as the demodulator of FIG. 2.

The signal processor 520 according to an embodiment of the present disclosure may include the synchronizer 521, the equalizer 523, an error corrector 524, and the like.

The synchronizer 521 may perform synchronization based on an input baseband signal.

The synchronizer 521 may perform synchronization based on a mean squared error (MSE).

For example, the synchronizer 521 may perform synchronization based on a mean squared error (MSE) and may perform synchronization again based on an updated mean squared error (MSE).

The signal processing device 520 may calculate an error e, which is a difference between the input baseband signal and a pilot signal, which is a reference signal, and may output a mean squared error (MSE) based on the calculated error e.

The equalizer 523 may perform equalization based on the signal synchronized by the synchronizer 521.

The equalizer 523 may perform synchronization based on a mean squared error (MSE).

For example, the equalizer 523 may perform synchronization based on a mean squared error (MSE) and may perform synchronization again based on an updated mean squared error (MSE).

The equalizer 523 may perform channel equalization using channel information while performing equalization.

The equalizer 523 may perform interference estimation or channel estimation based on the signal synchronized by the synchronizer 521.

The equalizer 523 may perform interference estimation or channel estimation based on a mean squared error (MSE).

For example, the equalizer 523 may perform interference estimation or channel estimation based on a mean squared error (MSE) and may perform interference estimation or channel estimation based on an updated mean squared error (MSE).

The equalizer 523 may estimate that a communication channel or a broadcast channel includes co-channel interference, adjacent-channel interference, single-frequency interference, burst noise, and phase noise.

The equalizer 523 may also estimate a communication channel or a broadcast channel as any one of a static channel, a mobile channel, and the like.

The static channel may include a Rayleigh channel, a Rician channel, and the like, and the mobile channel may include a vehicular channel, a Doppler channel, and the like.

The error corrector 524 may perform error correction based on the signal (equalization signal) equalized by the equalizer 523. In particular, the error corrector 524 may perform forward error correction.

In this case, the mean squared error (MSE) may be performed based on the signal from the equalizer 523.

The error corrector 524 may perform error correction based on the optimized mean squared error (MSE), thereby accurately performing error correction.

The error corrector 524 may accurately perform error correction even in the presence of interference related to burst noise.

Meanwhile, the error corrector 524 may accurately perform the error correction in spite of interference related to the narrow band noise.

The error corrector 524 may accurately perform error correction in consideration of that the communication channel is a static channel.

The error corrector 524 may accurately perform error correction in consideration of that the communication channel is a mobile channel.

Figure 9C:
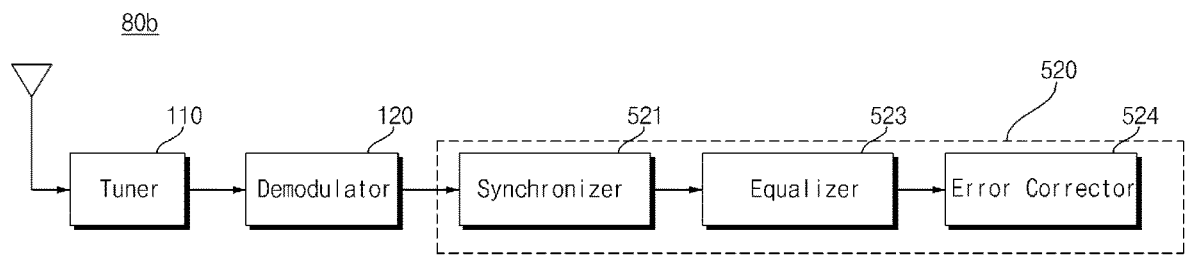
FIG. 9C is a block diagram illustrating an example of an RF receiving device according to another embodiment of the present disclosure.

FIG. 9C is a block diagram illustrating an example of an RF receiving device according to another embodiment of the present disclosure.

Referring to FIG. 9C, an RF receiving device 80*b* of FIG. 9C may be similar to the wireless reception device 80 of FIG. 9B, but may be different therefrom in that the demodulator 120 is further included between the tuner module 110 and the signal processing device 520.

The tuner module 110 of FIG. 9C may receive an RF signal including noise from a channel and may convert the RF signal into an intermediate frequency signal, and the demodulator 120 may convert the intermediate frequency signal into a baseband signal.

The signal processing device 520 may perform signal processing on the baseband signal from the demodulator 120, as described with reference to FIG. 9B.

Figure 9D:
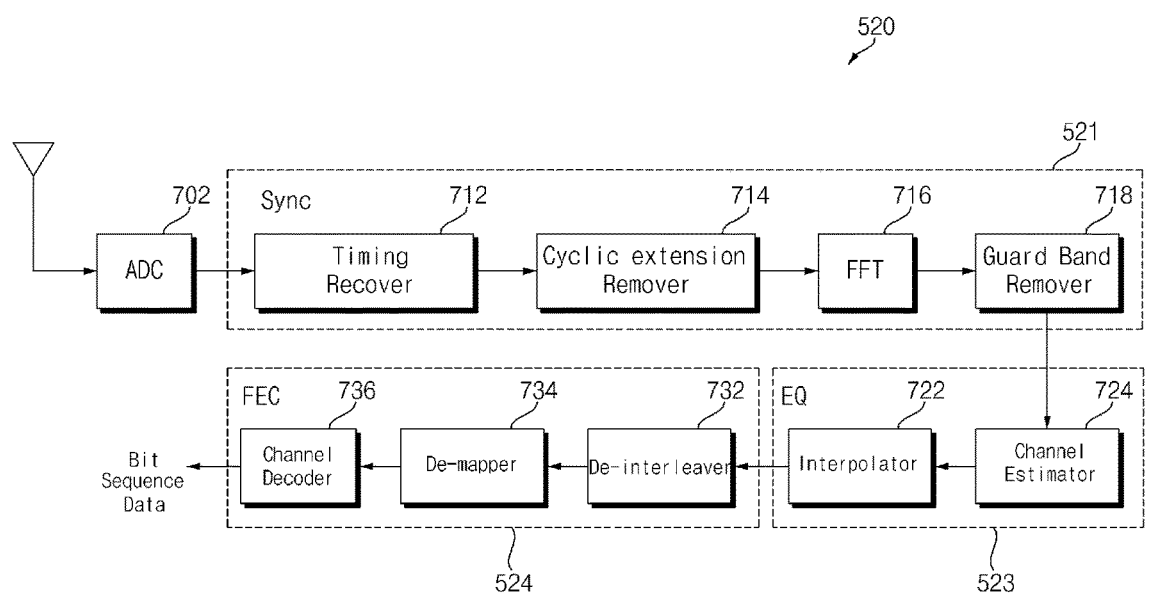
FIG. 9D is an internal block diagram showing an example of the signal processing device of FIG. 9B or 9C.

FIG. 9D is an internal block diagram illustrating the signal processing device of FIG. 9B or 9C.

Referring to FIG. 9D, the signal processing device 520 of FIG. 9B or 9C may receive a digital signal from an analog-digital-converter (ADC) 702. Here, the digital signal may be a baseband signal.

The signal processing device 520 of FIG. 9B or 9C may include the synchronizer 521, the equalizer 523, and the error corrector 524.

The synchronizer 521 may include a timing restorer 712 for performing timing recovery based on a received baseband signal, a prefix remover 714 for removing a cyclic prefix from the signal received from the timing restorer 712, a Fourier transformer 716 for performing fast Fourier transform (FFT) on the signal received from the prefix remover 714, and a guard band remover 718 for removing a guard band from the signal received from the Fourier transformer 716.

The equalizer 523 may calculate a channel transfer function value, symbol based noise, and subcarrier frequency based noise based on the signal from the synchronizer 521, and calculate channel state information based on the calculated channel transfer function value, symbol based noise, and subcarrier frequency based noise.

Meanwhile, the equalizer 523 may extract a pilot signal from the signal from the synchronizer 521, and calculate the channel transfer function value based on the extracted pilot signal. As a result, performances for bust noise and narrow band noise may be improved.

Meanwhile, the equalizer 523 may extract the pilot signal from the signal from the synchronizer 521, and calculate the symbol based noise and the subcarrier frequency based noise based on the extracted pilot signal. As a result, the performances for the bust noise and the narrow band noise may be improved.

Meanwhile, the equalizer 523 may calculate the symbol based noise and the subcarrier frequency based noise based on the signal from the synchronizer 521. As a result, the performances for the bust noise and the narrow band noise may be improved.

Meanwhile, the equalizer 523 may calculate channel state information (CSI) which is in proportion to power of the channel transfer function value, which is in inverse proportion to power of the symbol based noise, and which is in inverse proportion to power of the subcarrier frequency based noise. As a result, the performances for the bust noise and the narrow band noise may be improved.

Meanwhile, the equalizer 523 may calculate a log-likelihood ratio based on the channel state information (CSI). As a result, the performances for the bust noise and the narrow band noise may be improved.

Meanwhile, the signal processing device 520 according to an embodiment of the present disclosure may further include an error corrector 524 performing error correction based on the channel state information (CSI). As a result, the performances for the bust noise and the narrow band noise may be improved. Further, data may be stably ensured.

Meanwhile, the erector corrector 524 may perform the error correction based on a mean squared error which increases as a level of the channel state information (CSI) decreases. As a result, the performances for the bust noise and the narrow band noise may be improved. Further, the data may be stably ensured.

Meanwhile, the equalizer 523 may extract a pilot signal from the signal from the synchronizer 521, calculate a channel transfer function value of the extracted pilot signal, and selectively perform time interpolation based on the calculated channel transfer function value. As a result, the time interpolation may be selectively performed according to a channel. In particular, the data may be stably ensured even in the mobile channel environment. In addition, the channel estimation accuracy is improved.

To this end, the equalizer 523 may include a channel estimator 724 for extracting a pilot signal from the signal received from the synchronizer 521, calculating the channel transfer function value of the extracted pilot signal, and performing channel estimation based on the calculated channel transfer function value, and an interpolator 722 for performing interpolation based on the calculated channel transfer function value.

The interpolator 722 may perform time interpolation and frequency interpolation based on the calculated channel transfer function value.

According to the present disclosure, the interpolator 722 may selectively perform time interpolation based on the calculated channel transfer function value.

The equalizer 523 may turn off time interpolation and may perform frequency interpolation when the difference in a channel transfer function value of a pilot signal between the previous subframe and the current subframe is equal to or greater than a threshold. Accordingly, in the case of a mobile channel, time interpolation may be turned off, and thus data may be stably ensured.

The equalizer 523 may perform time interpolation and frequency interpolation when a difference in a channel transfer function value of a pilot signal between the previous subframe and the current subframe is less than the threshold. Accordingly, in the case of a static channel but not a mobile channel, time interpolation and frequency interpolation may be performed, and thus data may be stably ensured.

The equalizer 523 may estimate a channel to be a mobile channel when a difference in a channel transfer function value of a pilot signal between the previous subframe and the current subframe is equal to or greater than the threshold. Accordingly, in the case of a mobile channel, time interpolation may be turned off, and thus data may be stably ensured. In addition, channel estimation accuracy may be improved.

The equalizer 523 may estimate a channel to be a static channel when a difference in a channel transfer function value of a pilot signal between the previous subframe and the current subframe is less than the threshold. Accordingly, in the case of a static channel, time interpolation and frequency interpolation may be performed, and data may be stably ensured. In addition, channel estimation accuracy may be improved.

The equalizer 523 may determine whether time interpolation is performed based on the calculated channel transfer function value, before time interpolation is performed. Thus, channel estimation accuracy may be improved, and as a result, data may be stably ensured.

The equalizer 523 may turn off time interpolation and may perform frequency interpolation in response to a difference between a representative value of a channel transfer function value of a pilot signal in the previous subframe and a representative value of a channel transfer function value of a pilot signal in the current subframe is equal to or greater than the threshold. Thus, time interpolation may be selectively performed based on the channel. In particular, data may also be stably ensured in a mobile channel environment.

The threshold may vary based on the moving speed or mode of the signal processing device 520. Thus, time interpolation may be selectively performed based on the channel. In particular, data may also be stably ensured in a mobile channel environment.

The equalizer 523 may turn off time interpolation and may perform frequency interpolation from the next subframe when a difference in a channel transfer function value of a pilot signal between the previous subframe and the current subframe is equal to or greater than the threshold. Thus, time interpolation may be selectively performed based on the channel. In particular, data may also be stably ensured in a mobile channel environment.

The equalizer 523 may turn off time interpolation and may perform frequency interpolation from the current subframe when a difference in a channel transfer function value of a pilot signal between the previous subframe and the current subframe is equal to or greater than the threshold. Thus, time interpolation may be selectively performed based on the channel. In particular, data may also be stably ensured in a mobile channel environment.

The equalizer 523 may turn off time interpolation and may vary the time at which time interpolation is turned off based on the moving speed or mode of the signal processing device 520 when the difference in a channel transfer function value of a pilot signal between the previous subframe and the current subframe is equal to or greater than the threshold. Because the time at which time interpolation is turned off changes, data may be stably ensured adaptively to the moving speed or the mode.

When a first subframe and a second subframe in one frame have different transport formats, the equalizer 523 may perform control to make a threshold for the first subframe and a threshold for a second subframe different from each other. Data may be stably ensured by making thresholds different from each other according to transport formats. In addition, channel estimation accuracy may be improved.

The equalizer 523 may perform channel equalization using channel information after channel estimation or interpolation is performed. For example, the equalizer 523 may perform channel equalization in the time or frequency domain.

Then, the error corrector 524 may include a deinterleaver 732 for performing deinterleaving based on the signal of the equalizer 523, a demapper 734 for performing demapping, and a channel decoder 736 for performing channel decoding. Thus, the error corrector 524 may perform forward error correction, and may finally output bit sequence data.

The signal processing device 520 may determine whether a channel is a mobile channel using a channel transfer function value of a pilot signal positioned along a pilot pattern before time interpolation is performed.

For example, the signal processing device 520 may calculate a difference in a channel transfer function value at the position of a pilot signal between the current symbol and the previous symbol, and may detect whether a channel is a mobile channel based on the calculated difference.

For example, in the case of a broadcast signal according to the ATSC 3.0 standard, a preamble, first/last sub frame boundary symbols (SBSs), and a data symbol have different pilot types and pilot patterns due to the structure of a frame, and thus the signal processing device 520 may use a scattered pilot of the data symbol.

In detail, the signal processing device 520 may calculate a difference in a channel transfer function value during one subframe section, and may determine whether a mobile channel is detected, based on the threshold.

The signal processing device 520 may turn off time interpolation in the case of a mobile channel.

In this case, the signal processing device 520 may turn off time interpolation in the next symbol based on the time at which the mobile channel is detected.

The signal processing device 520 may check information on whether a mobile channel of a previous frame is detected in a corresponding subframe of a next frame, and may turn on or off time interpolation.

The signal processing device 520 may perform control to selectively perform time interpolation base on a channel transfer function value, which rapidly changes over time. Thus, channel estimation accuracy may be improved.

In particular, the signal processing device 520 may detect whether a channel is a mobile channel using a signal before time interpolation and frequency interpolation are performed. Thus, the accuracy of detection of the mobile channel may be improved.

The signal processing device 520 may control the time at which time interpolation is turned off and may minimize delay in the time at which time interpolation is turned off.

The signal processing device 520 may determine whether a channel is a mobile channel based on a difference in a channel transfer function value at the position of a pilot signal between the current symbol and the previous symbol during one subframe section.

The signal processing device 520 may determine the channel to be a mobile channel and may turn off time interpolation when the difference in the channel transfer function value in one symbol section is equal to or greater than the threshold.

The signal processing device 520 may determine the channel to be a mobile channel and may determine a reference for turning off time interpolation according to the threshold.

For example, the signal processing device 520 may determine whether time interpolation is turned off by comparing the difference in the channel transfer function value in one symbol section with the threshold while increasing the Doppler frequency (Hz).

The signal processing device 520 may set the threshold at which to vary time interpolation to OFF from ON before the Doppler frequency becomes 10 to 20 Hz based on the time at which an error occurs due to the Doppler frequency (Hz).

Meanwhile, the mobile channel detected by the signal processing device 520 may correspond to a channel which is changed by a Doppler speed over time.

FIGS. 10A to 12 are diagrams referenced for explaining an operation method of FIG. 8.

Figure 10A:
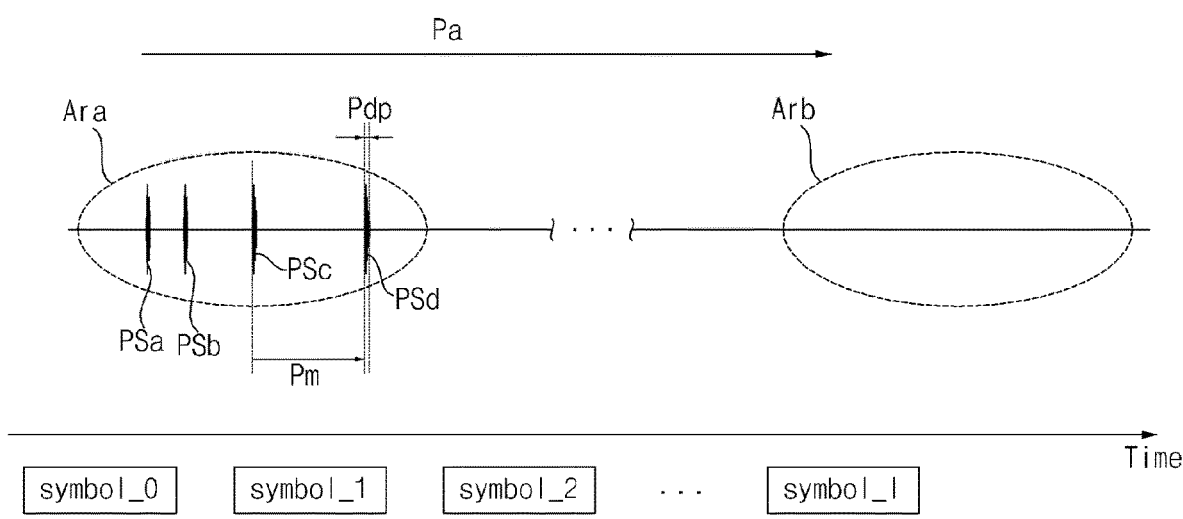
FIGS. 10A to 12 are diagrams referenced for explaining an operation method of FIG. 8.

First, FIG. 10A illustrates that the burst noise by the impulsive interference is generated.

OFDM symbols are sequentially received according to the time axis, but as illustrated in FIG. 10A, four pulses PSa, PSbm, PSc, and PSd may be generated due to the burst noise in symbol 0, symbol 1, etc.

In FIG. 10A, an interval between PSc and PSd as an interval of approximately Pm may be expressed by dozens of μsec (micro seconds) and a pulse width of PSd may be expressed by several n sec (nano seconds).

Meanwhile, an interval between first burst noise Ara and second burst noise Arb may be dozens of m sec (milliseconds).

While the burst noise is generated in FIG. 10A, when the channel state information (CSI) is calculated by using Equation 2, there is a problem in that inaccurate channel state information is calculated due to a time axis based error.

As a result, the signal processing device 520 in the present disclosure calculates the channel state information (CSI) by using Equation 3.

In particular, the symbol based noise $\sigma_l$ is utilized instead of the additive white Gaussian noise of Equation 2 to calculate accurate channel state information even though the burst noise is generated.

Therefore, accurate error correction is possible even in error correction to improve the performance for the burst noise.

Figure 10B:
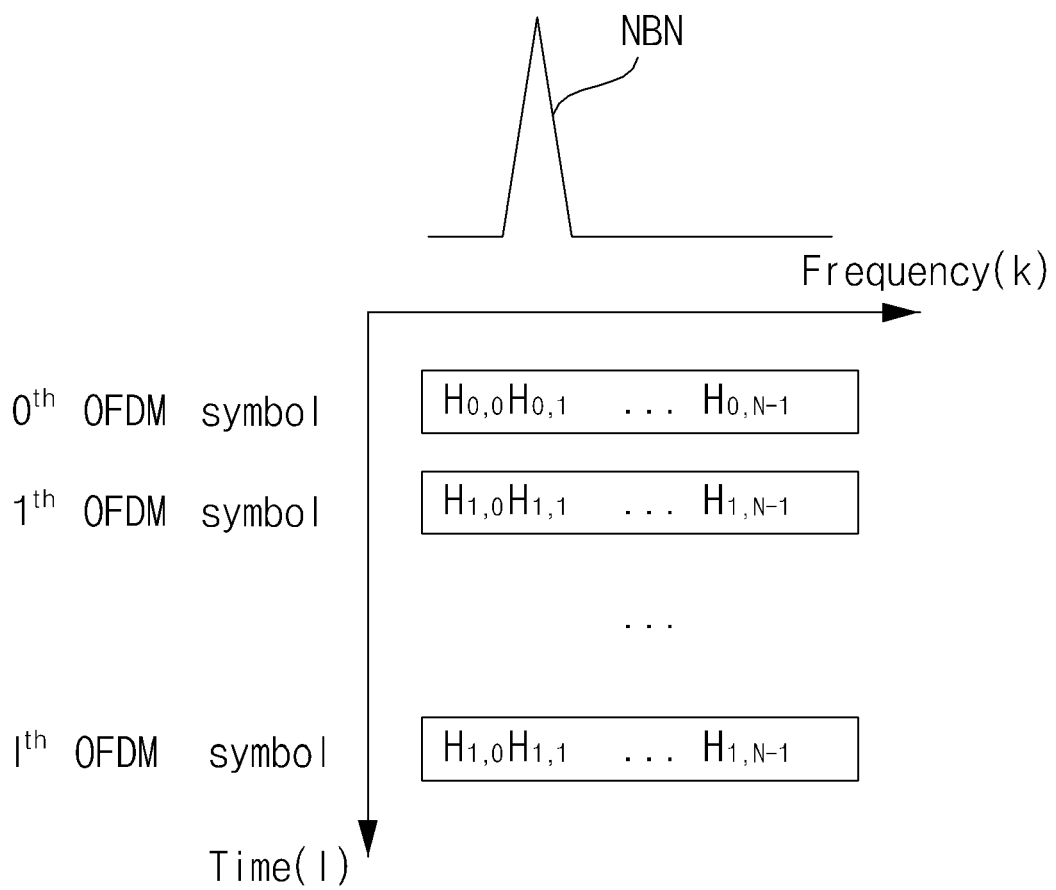

Then, FIG. 10B illustrates that the narrow band noise by the co-channel interference is generated.

The channel transfer function is shown for each subcarrier frequency according to the frequency axis, but as illustrated in FIG. 10B, the narrow band noise may be generated around Hm,l, i.e., around a first subcarrier frequency.

While the narrow band noise is generated in FIG. 10B, when the channel state information (CSI) is calculated by using Equation 2, there is a problem in that inaccurate channel state information is calculated due to a frequency axis based error.

As a result, the signal processing device 520 in the present disclosure calculates the channel state information (CSI) by using Equation 3.

In particular, the subcarrier frequency based noise $\sigma_k$ is utilized instead of the additive white Gaussian noise of Equation 2 to calculate accurate channel state information even though the narrow band noise is generated.

Therefore, accurate error correction is possible even in error correction to improve the performance for the narrow band noise.

Consequently, the signal processing device 520 may calculate channel state information (CSI) which is in proportion to power $\sigma_l^2$ of the channel transfer function $H_{l,k}$, which is in inverse proportion to power $\sigma_l^2$ of the symbol based noise $\sigma_l$, and which is in inverse proportion to power $\sigma_l^2$ of the subcarrier frequency based noise $\sigma_k$ according to Equation 3.

As a result, when computing the channel state information (CSI), it is possible to accurately calculate the channel state information by considering contents regarding the burst noise and the narrow band noise.

Meanwhile, the signal processing device 520 performs the error correction based on the accurate channel state information to improve the performances for the burs noise and the narrow band noise.

Figure 11:
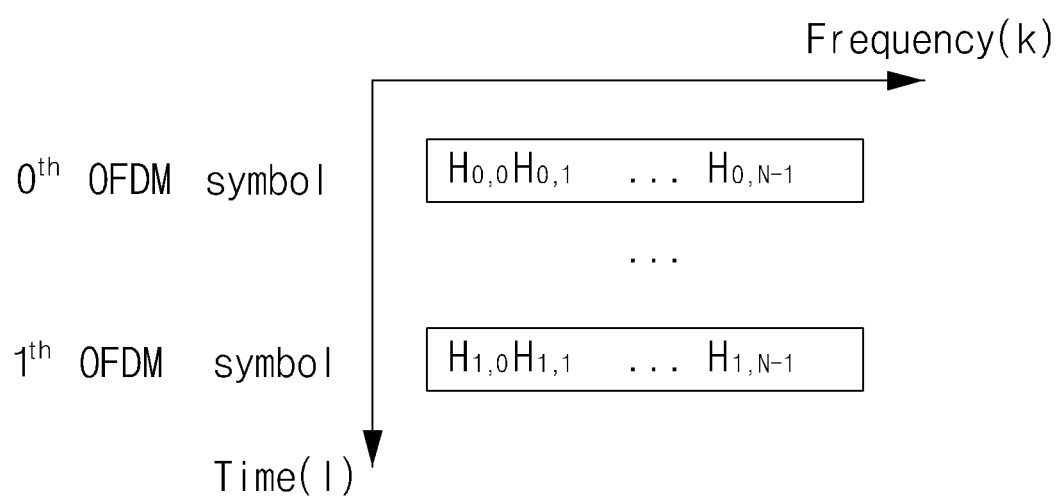

FIG. 11 is a diagram illustrating the channel transfer function value when the burst noise and the narrow band noise in FIGS. 10A and 10B are not present.

The signal processing device 520 may calculate channel state information (CSI) which is in proportion to the power $\sigma_I^2$ of the channel transfer function $H_{l,k}$, which is in inverse proportion to the power $\sigma_l^2$ of the symbol based noise $\sigma_l$, and which is in inverse proportion to the power $\sigma_l^2$ of the subcarrier frequency based noise $\sigma_k$ according to Equation 3.

As a result, accurate channel state information computation is possible by considering various channel environments.

When the first subframe and the second subframe in one frame have different transport formats, the equalizer 523 in the signal processing device 520 may perform control to make the threshold for the first subframe and the threshold for the second subframe different from each other.

By varying the threshold based on transport formats, a reference for the mobile channel may be changed, and as a result, the time at which time interpolation is turned off may be changed. As a result, data may be stably ensured. In addition, channel estimation accuracy may be improved.

For example, in the case of FFT=32 K and QAM=64 in the first subframe, the equalizer 523 in the signal processing device 520 may set the threshold for the first subframe to correspond to a difference in a channel transfer function value at a Doppler frequency of 30 Hz.

In another example, in the case of FFT=8 K and QAM=QPSK in the second subframe, the equalizer 523 in the signal processing device 520 may set the threshold for the second subframe to correspond to a difference in a channel transfer function value at a Doppler frequency of 50 Hz.

In another example, in the case of FFT=16 K and QAM=256 in the third subframe, the equalizer 523 in the signal processing device 520 may set the threshold for the third subframe to correspond to a difference in a channel transfer function value at a Doppler frequency of 10 Hz.

The equalizer 523 in the signal processing device 520 may lower the threshold as the computational load of Fourier transform is increased.

The equalizer 523 in the signal processing device 520 may lower the threshold as the amount of data of a modulation method is increased.

The equalizer 523 in the signal processing device 520 may lower the threshold as the moving speed of the signal processing device 520 is increased.

The equalizer 523 in the signal processing device 520 may set the time at which time interpolation is turned off to be earlier as a computational load of Fourier transform is increased.

The equalizer 523 in the signal processing device 520 may set the time at which time interpolation is turned off to be earlier as the amount of data of a modulation method is increased.

Meanwhile, the equalizer 523 in the signal processing device 520 may set an off time of the time interpolation to be earlier as a moving speed of the signal processing device 520 increases.

Figure 12:
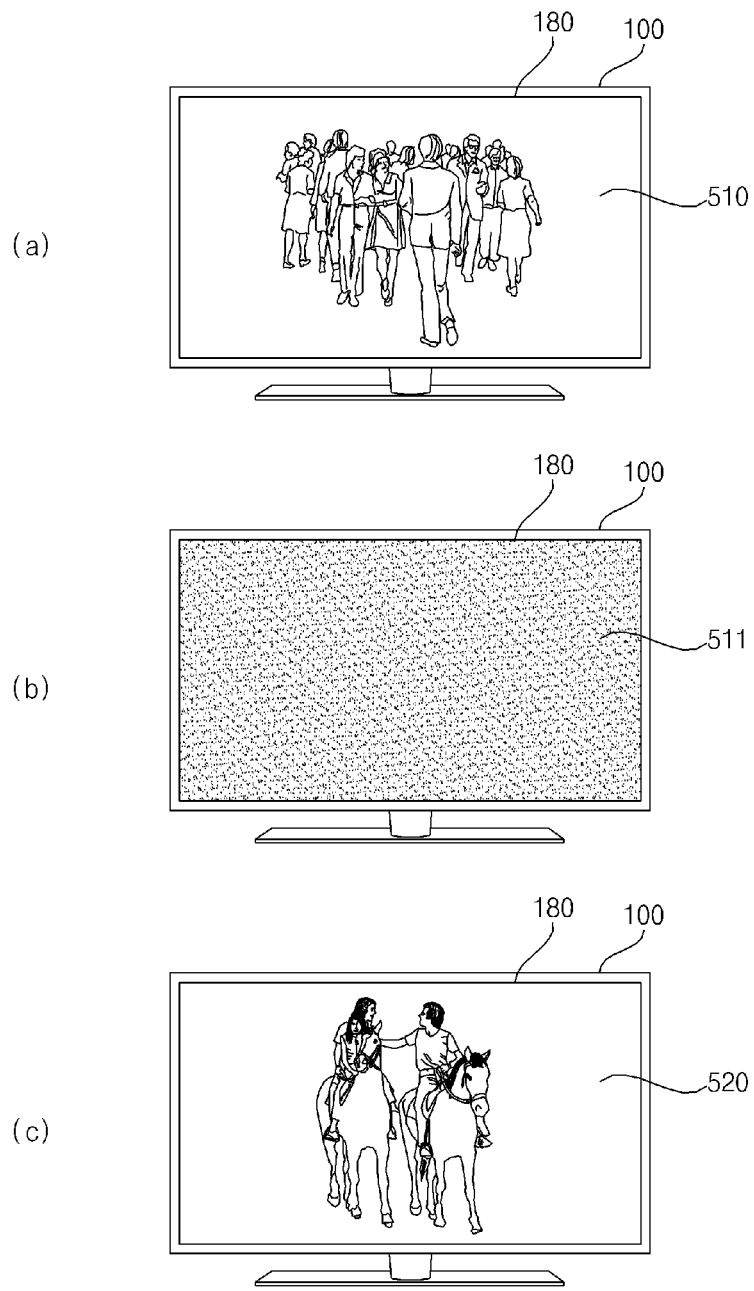

FIG. 12 is a set of diagrams showing an example of a broadcasting image based on whether time interpolation is ON or OFF in a static channel and a mobile channel.

FIG. 12A shows an example of a broadcasting image 510 displayed on the display 180 of the image display apparatus 100 when time interpolation in a static channel is turned on as shown in (a) of FIG. 5B.

As described above, even if time interpolation in a static channel is performed, broadcast signal data may be stably ensured, and thus the broadcasting image 510 may be clearly displayed.

FIG. 12B shows an example of a broadcasting image 511 displayed on the display 180 of the image display apparatus 100 when time interpolation in a mobile channel is turned on, as shown in (b) of FIG. 5B.

As described above, when time interpolation in a mobile channel is performed, the accuracy of time interpolation may be remarkably degraded, and thus the accuracy of broadcast signal data may be degraded, and accordingly, a defective image 511 may be displayed as shown in the drawing.

FIG. 12C illustrates the broadcasting image 520 displayed in the display 180 of the image display apparatus 100 when the time interpolation in the mobile channel illustrated in (b) of FIG. 5B is turned off.

As described above, when the time interpolation in the mobile channel is turned off, it is possible to ensure stable broadcasting signal data, so a vivid broadcasting image 520 may be displayed.

FIG. 12B may also be a broadcasting image 511 displayed in the display 180 of the image display apparatus 100 when the burst noise or the narrow band noise is generated while the channel state information computation by Equation 2 is performed.

As described above, when the burst noise or the narrow band noise is generated while the channel state information computation by Equation 2 is performed, the computation of the channel state information is inaccurate, so a defective image 511 may be displayed as illustrated in FIG. 12B.

FIG. 12C illustrates a broadcasting image 520 displayed in the display 180 of the image display apparatus 100 when the burst noise or the narrow band noise is generated while the channel state information computation by Equation 3 is performed.

As described above, even though the burst noise or the narrow band noise is generated while the channel state information computation by Equation 3 is performed, the computation of the channel state information is accurate, so a vivid broadcasting image 520 with no defect may be displayed as illustrated in FIG. 12C.

Operations performed by a signal processing device or an image display apparatus according to the present disclosure may be embodied as processor-readable code on a processor-readable recording medium. The processor-readable recording medium may include any data storage device that is capable of storing programs or data which is capable of being thereafter read by a processor. The processor-readable recording medium may also be distributed over network coupled calculator systems so that the calculator readable code is stored and executed in a distributed fashion.

While the present disclosure has been particularly shown and described with reference to exemplary embodiments thereof, it is to be understood that the same is by way of illustration and example only and is not to be taken in conjunction with the present disclosure. It will be understood by those skilled in the art that various changes in form and details may be made therein without departing from the subject matter and scope of the present disclosure.

The present disclosure is applicable to the signaling processing device and the image display apparatus including the same.

What is claimed is:

1. A signal processing device for demodulating a radio frequency (RF) signal received through a channel and processing a demodulated baseband signal, the signal processing device comprising:
   a synchronizer configured to perform a Fourier transform based on the received baseband signal; and an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise.

2. The signal processing device of claim 1, wherein the equalizer extracts a pilot signal from the signal from the synchronizer, and calculates the channel transfer function based on the extracted pilot signal.

3. The signal processing device of claim 1, wherein the equalizer extracts the pilot signal from the signal from the synchronizer, and calculates the symbol based noise and the subcarrier frequency based noise based on the extracted pilot signal.

4. The signal processing device of claim 1, wherein the equalizer calculates symbol index based noise and subcarrier index based noise based on the signal from the synchronizer.

5. The signal processing device of claim 1, wherein the equalizer calculates channel state information which is in proportion to power of the channel transfer function value, which is in inverse proportion to power of the symbol based noise, and which is in inverse proportion to power of the subcarrier frequency based noise.

6. The signal processing device of claim 1, wherein the equalizer calculates a log-likelihood ratio based on the channel state information.

7. The signal processing device of claim 1, wherein an error corrector configured to perform error correction based on the channel state information.

8. The signal processing device of claim 7, wherein the error corrector performs the error correction based on a mean squared error which increases as a level of the channel state information decreases.

9. The signal processing device of claim 1, wherein the equalizer extracts a pilot signal from the signal from the synchronizer, and calculates a channel transfer function of the extracted pilot signal, and selectively performs time interpolation based on the calculated channel transfer function value.

10. The signal processing device of claim 9, wherein the equalizer turns off the time interpolation and performs frequency interpolation in response to a difference in the channel transfer function value of the pilot signal being equal to or more than a reference value between a previous subframe and a current subframe.

11. The signal processing device of claim 10, wherein the equalizer performs the time interpolation and the frequency interpolation in response to the difference in the channel transfer function value of the pilot signal being less than the reference value between the previous subframe and the current subframe.

12. The signal processing device of claim 9, wherein the equalizer estimates that the channel is a mobile channel in response to the difference in the channel transfer function value of the pilot signal being equal to or more than the reference value between the previous subframe and the current subframe.

13. The signal processing device of claim 9, wherein the equalizer estimates that the channel is a static channel in response to the difference in the channel transfer function value of the pilot signal being less than the reference value between the previous subframe and the current subframe.

14. The signal processing device of claim 9, wherein the equalizer turns off the time interpolation and performs the frequency interpolation in response to a difference between a representative value of the channel transfer function value of the pilot signal in the previous subframe and the representative value of the channel transfer function of the pilot signal in the current subframe being equal to or more than a reference value.

15. The signal processing device of claim 9, wherein the equalizer turns off the time interpolation and changes an off time of the time interpolation based on a moving speed or a mode of the signal processing device, in response to the difference in the channel transfer function value of the pilot signal being equal to or more than the reference value between the previous subframe and the current subframe.

16. The signal processing device of claim 1, wherein the synchronizer removes a cyclic prefix based on the received baseband signal before the Fourier transform,
removes a guard band after the Fourier transform, and
performs timing restoration based on the received baseband signal before removing the cyclic prefix.

17. A signal processing device for demodulating a radio frequency (RF) signal received through a channel and processing a demodulated baseband signal, the signal processing device comprising:
a synchronizer configured to remove a guard band based on the received baseband signal; and
an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise.

18. An image display apparatus comprising:
a display; and
a signal processing device,
wherein the signal processing device comprises:
a synchronizer configured to perform a Fourier transform based on a baseband signal, wherein the baseband signal is demodulated from a radio frequency (RF) signal received through a channel; and
an equalizer configured to calculate a channel transfer function value, symbol based noise, and subcarrier frequency based noise based on the signal from the synchronizer, and calculate channel state information based on the calculated channel transfer function value, symbol based noise, and subcarrier frequency based noise.

19. The image display apparatus of claim 18, further comprising:
a tuner configured to receive the RF signal and to convert the RF signal into the baseband signal.

20. The image display apparatus of claim 18, further comprising:
a tuner configured to receive the RF signal and to convert the RF signal into an intermediate frequency signal; and
a demodulator configured to convert the intermediate frequency signal into the baseband signal.

* * * * *